(12) United States Patent
Prince

(10) Patent No.: US 10,752,302 B2
(45) Date of Patent: Aug. 25, 2020

(54) AERODYNAMIC VEHICLE ATTACHMENT

(71) Applicant: Truck Tail, LLC, Lexington, KY (US)

(72) Inventor: Gregory Jerome Prince, Lexington, KY (US)

(73) Assignee: Gregory J. Prince, Lexington, KY (US)

( * ) Notice: Subject to any disclaimer, the term of this patent is extended or adjusted under 35 U.S.C. 154(b) by 122 days.

(21) Appl. No.: 16/056,329

(22) Filed: Aug. 6, 2018

(65) Prior Publication Data

US 2019/0084629 A1    Mar. 21, 2019

Related U.S. Application Data

(60) Provisional application No. 62/560,846, filed on Sep. 20, 2017.

(51) Int. Cl.
*B62D 35/00* (2006.01)
*B60R 9/06* (2006.01)
*B60R 11/00* (2006.01)
*B62D 33/027* (2006.01)

(52) U.S. Cl.
CPC ............ *B62D 35/007* (2013.01); *B60R 9/065* (2013.01); *B60R 11/00* (2013.01); *B60R 2011/004* (2013.01); *B62D 33/0273* (2013.01)

(58) Field of Classification Search
CPC ... B62D 35/007; B62D 33/0273; B60R 11/00; B60R 9/065; B60R 2011/004
USPC .................................. 296/37.6, 187.5, 180.1
See application file for complete search history.

(56) References Cited

U.S. PATENT DOCUMENTS

| | | | |
|---|---|---|---|
| 4,475,759 A | 10/1984 | Wine | |
| 4,585,263 A * | 4/1986 | Hesner | B62D 35/007 |
| | | | 296/180.1 |
| 4,863,213 A | 9/1989 | Deaver et al. | |
| 5,232,259 A * | 8/1993 | Booker | B60R 11/06 |
| | | | 224/404 |
| 5,352,008 A | 10/1994 | Denvir | |
| 5,498,058 A * | 3/1996 | Kuo | B62D 35/001 |
| | | | 296/180.1 |
| 5,688,020 A | 11/1997 | Burg | |
| 6,012,762 A | 1/2000 | Burg | |
| 6,073,985 A * | 6/2000 | Keip | B60R 9/00 |
| | | | 296/37.1 |
| 6,325,448 B1 * | 12/2001 | Estrada | B60R 11/06 |
| | | | 296/180.1 |
| 6,712,423 B2 | 3/2004 | Lehmann | |
| 7,234,618 B2 * | 6/2007 | Warganich | B60R 7/02 |
| | | | 224/403 |
| 10,005,501 B2 * | 6/2018 | Povinelli | B60J 7/141 |
| 10,099,730 B1 * | 10/2018 | Williams | B62D 35/007 |

* cited by examiner

*Primary Examiner* — Pinel E Romain

(57) ABSTRACT

An aerodynamic vehicle attachment is disclosed that includes a body being triangular and having a base, a first sidewall, a second sidewall, and a face. The base has a base contour, and the base, the first sidewall, the second sidewall and the face define an interior storage compartment. A lid covers the interior storage compartment and has a lid contour and a lip extending upward external relative to the interior storage compartment. A hinge is coupled to the face of the body and the lid, and has a fastener. The fastener is configured to removably couple to an outer surface of a top of a tailgate of a vehicle so that the aerodynamic vehicle attachment is coupled to the outside of the vehicle.

19 Claims, 18 Drawing Sheets

| RADIUS OF ARC (cm) | LENGTH OF ARC (cm) | WIDTH OF ARC (cm) | HEIGHT OF ARC (cm) | APOTHEM (cm) | ANGLE SUBTENDED BY ARC (deg) | AREA SEGMENT (cm²) |
|---|---|---|---|---|---|---|
| 67.25541 | 44.82506 | 44 | 3.7 | 63.55541 | 38.18707 | 109.14485 |

| RADIUS OF ARC (cm) | LENGTH OF ARC (cm) | WIDTH OF ARC (cm) | HEIGHT OF ARC (cm) | APOTHEM (cm) | ANGLE SUBTENDED BY ARC (deg) | AREA SEGMENT (cm²) |
|---|---|---|---|---|---|---|
| 34.45 | 119.38 | 68 | 40 | 5.55 | 198.54 | 2244.96 |

| RADIUS OF ARC (cm) | LENGTH OF ARC (cm) | WIDTH OF ARC (cm) | HEIGHT OF ARC (cm) | APOTHEM (cm) | ANGLE SUBTENDED BY ARC (deg) | AREA SEGMENT (cm²) |
|---|---|---|---|---|---|---|
| 34.45 | 119.38 | 68 | 40 | 5.55 | 198.54 | 2244.96 |

FUEL ECONOMY OF PICKUP TRUCKS WITH AND WITHOUT ATTACHMENT IN mpg

| CLASS | MILES | WITHOUT (mpg) | WITH (mpg) | IMPROVEMENT (mpg) |
|---|---|---|---|---|
| 2017 F-150 | 150 | 18.8 | 20.2 | 1.4 |
| 2014 F-150 | 200 | 16.7 | 18.7 | 2.0 |
| 2014 DODGE RAM | 350 | 20.3 | 21.9 | 1.6 |
| 2003 TUNDRA | 400 | 16 | 18 | 2.0 |
| 2014 TUNDRA | 500 | 16.6 | 18.1 | 1.5 |

AERODYNAMIC VEHICLE ATTACHMENT

RELATED APPLICATIONS

This application claims priority to U.S. Provisional Patent Application No. 62/560,846 filed on Sep. 20, 2017 and entitled "Pickup Truck Tailgate Aerodynamic Drag Reduction and Storage Attachment," which is hereby incorporated by reference in full.

BACKGROUND

There are many types of vehicles available in the marketplace. Historically, pickup trucks are associated with being a work vehicle such as for construction or other trades. The popularity of pickup trucks has increased, and now pickup trucks are used not only as a work vehicle but as a primary vehicle for personal use and recreational activities. Customers desire similar performance and fuel efficiency from pickup trucks to that of cars, along with an attractive exterior design.

Drag is resistance caused by penetrating the atmosphere with a leading edge of the vehicle creating turbulent airflow over, under, and around a surface area. This may also be described as a result of skin friction. A high amount of drag on the vehicle decreases performance and particularly fuel efficiency. In a pickup truck, airflow passes over the cab and right behind the cab, and a low-pressure area forms while turbulence is increased just rearward of the tailgate. The unique configuration of a pickup truck with a cab and a bed typically experiences a greater amount of drag than a car.

Various aerodynamic products exist in the marketplace to reduce drag on a pickup truck which in turn, increases fuel efficiency. Examples of products include spoilers, air deflectors, stabilizers, tonneau covers, storage boxes, or the like, and have varying degrees of success. Some of these products are permanently mounted to the vehicle, mounted inside of the bed of the pickup truck, permanently modify the tailgate, alter the operation of the tailgate, require removal and replacement of the tailgate, cover the entire pickup bed and significantly change the aesthetics of the vehicle.

SUMMARY

An aerodynamic vehicle attachment is disclosed that includes a body being triangular and having a base, a first sidewall, a second sidewall, and a face. The base has a base contour, and the base, the first sidewall, the second sidewall and the face define a interior storage compartment. A lid covers the interior storage compartment and has a lid contour and a lip extending upward external relative to the interior storage compartment. A hinge is coupled to the face of the body and the lid, and has a fastener. The fastener is configured to removably couple to an outer surface of a top of a tailgate of a vehicle so that the aerodynamic vehicle attachment is coupled to the outside of the vehicle.

An aerodynamic vehicle attachment is also disclosed including a body being triangular, having an interior storage compartment and a first aerodynamic shape. A lid is coupled to the body, configured to cover the interior storage compartment and has a second aerodynamic shape. A fastener is coupled to the body and the lid, and is configured to removably couple to an outer surface of a top of a tailgate of a vehicle so that the aerodynamic vehicle attachment is coupled to the outside of the vehicle. The first aerodynamic shape and the second aerodynamic shape direct laminar airflow across first aerodynamic shape and the second aerodynamic shape creating less air turbulence and less drag on the vehicle.

DETAILED DESCRIPTION

An aerodynamic vehicle attachment is disclosed which couples to a vehicle, specifically a pickup truck, and provides added storage and improvements to the aerodynamics of the vehicle. For example, the aerodynamic vehicle attachment includes a body being triangular, having an interior storage compartment and a first aerodynamic shape. A lid is coupled to the body, configured to cover the interior storage compartment and has a second aerodynamic shape. A fastener is coupled to the body and the lid, and is configured to removably couple to an outer surface of a top of a tailgate of a vehicle so that the aerodynamic vehicle attachment is coupled to the outside of the vehicle. The design enables the aerodynamic vehicle attachment to be quickly, easily and conveniently installed, used and removed by a single user without the use of a tool. Moreover, when removed, there is no alteration or damage to the vehicle or tailgate such as drilled holes, scuffing to the paint or dents from various attachments. While in use, the tailgate is unaltered and can be operated in a normal fashion. The aerodynamic vehicle attachment does not impede the cargo capacity or the loading zone of the pickup bed.

The aerodynamic vehicle attachment is attached rearward of the tailgate of the vehicle in a space having a vacuum effect. The first aerodynamic shape and the second aerodynamic shape of the aerodynamic vehicle attachment are curved. The shape of these curved surfaces direct laminar airflow across the first aerodynamic shape and the second aerodynamic shape creating less air turbulence and less drag on the vehicle which improves fuel economy.

Figure 1:
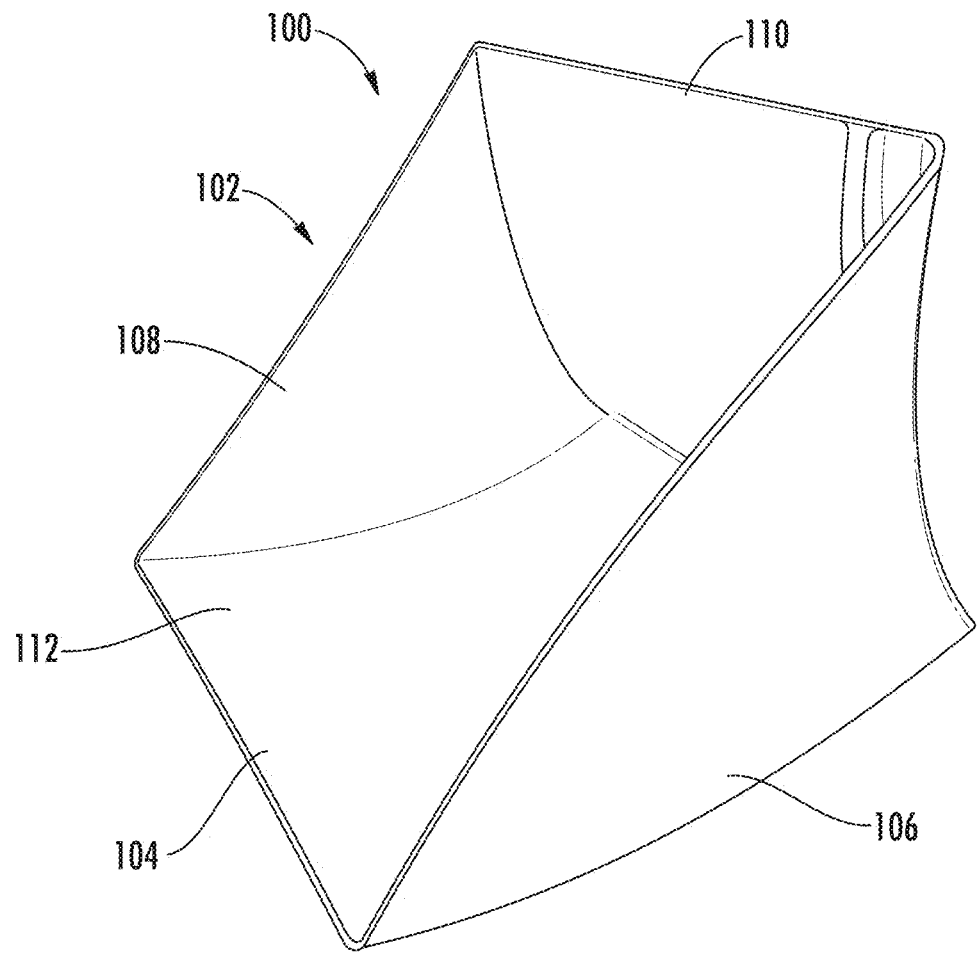
FIGS. 1 and 2 are perspective view of an aerodynamic vehicle attachment, in accordance with some embodiments.
Figure 2:
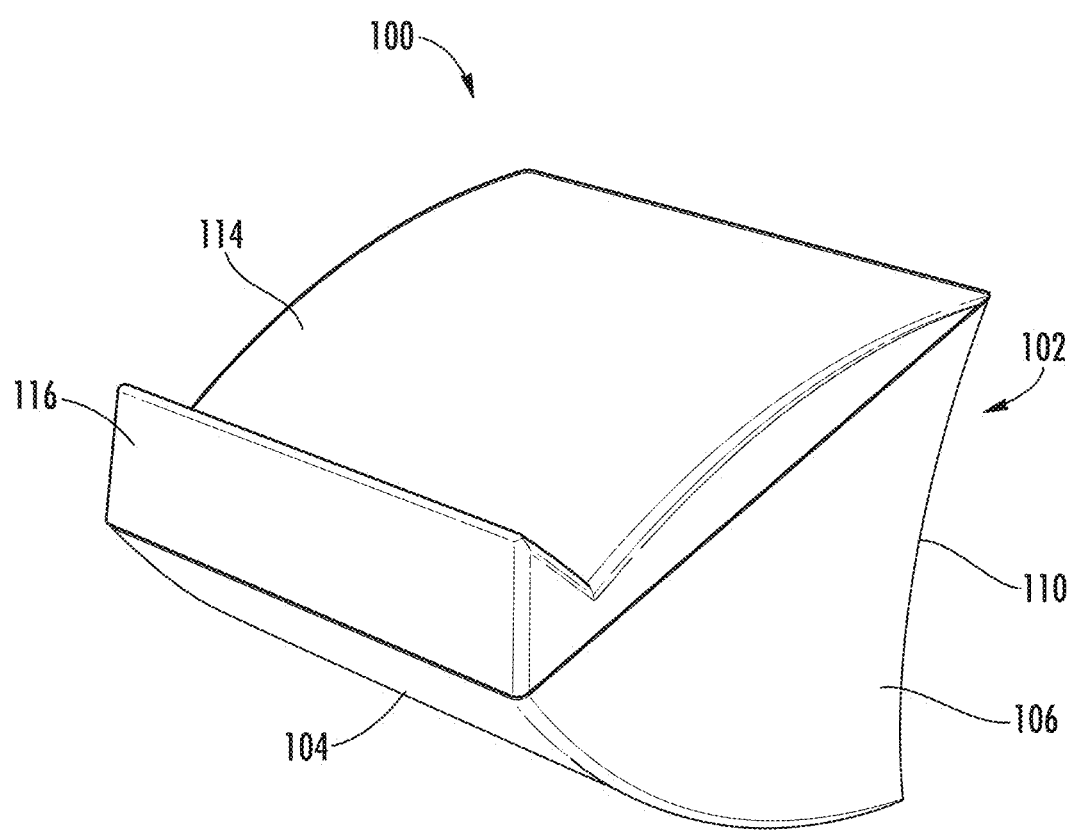

FIGS. 1 and 2 are perspective view of an aerodynamic vehicle attachment 100, in accordance with some embodiments. FIG. 1 shows an open view of the interior of the aerodynamic vehicle attachment 100, while FIG. 2 shows a closed view of the aerodynamic vehicle attachment 100. A body 102 is generally triangular and has a base 104, a first sidewall 106, a second sidewall 108 which is opposite and the same as the first sidewall 106, and a face 110. The base 104, the first sidewall 106, the second sidewall 108 and the face 110 define an interior storage compartment 112. A lid 114 is configured to cover the interior storage compartment 112. The lid 114 may be contoured or curved, and has a lip 116. The lip 116 is located at an edge of the lid 114 opposite a hinge 118 and spans across the edge of the lid 114. The lip 116 extends upward externally relative to the interior storage compartment 112 by approximately 9.5 centimeters. In other embodiments, the lip 116 may extend 8.0 to 10.0 centimeters, at least 9.0 centimeters, or a maximum of 11.0 centimeters. The lip 116 and the weight of the lid 114 are configured to enable the lid 114 to remain in the closed position while the vehicle is stationary or moving. This is accomplished by the lip 116 extending upward and thereby contacting airflow passing over the lid 114 which creates a downward force on the lip 116 and lid 114 and thus maintaining the lid 114 in the closed position. In some embodiments, the weight of the lid is approximately 2 pounds to 3 pounds, 1.8 pounds to 2.5 pounds or a maximum of 3.5 pounds.

Figure 3:
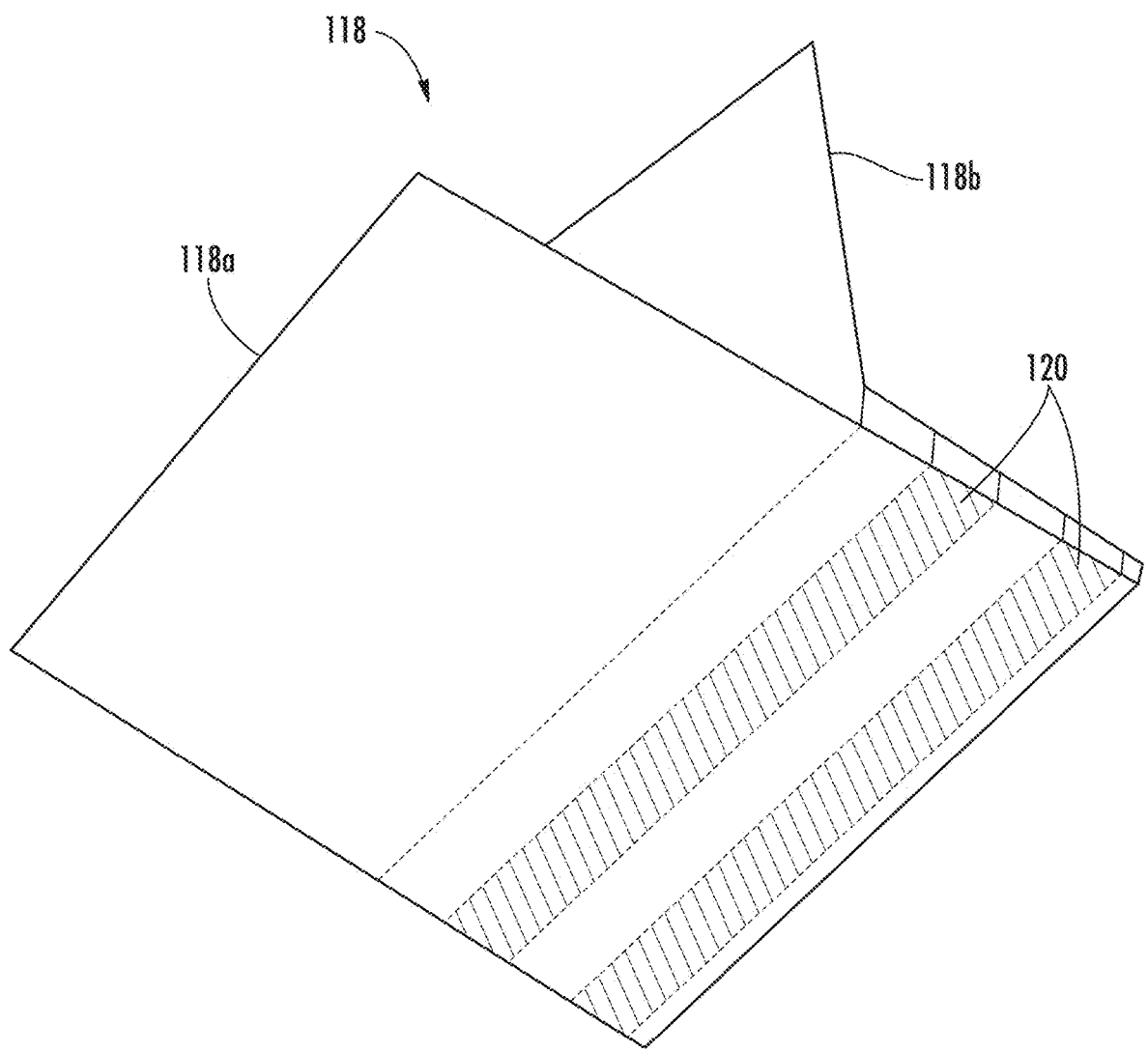
FIG. 3 is perspective view of a hinge for the aerodynamic vehicle attachment, in accordance with some embodiments.
Figure 4:
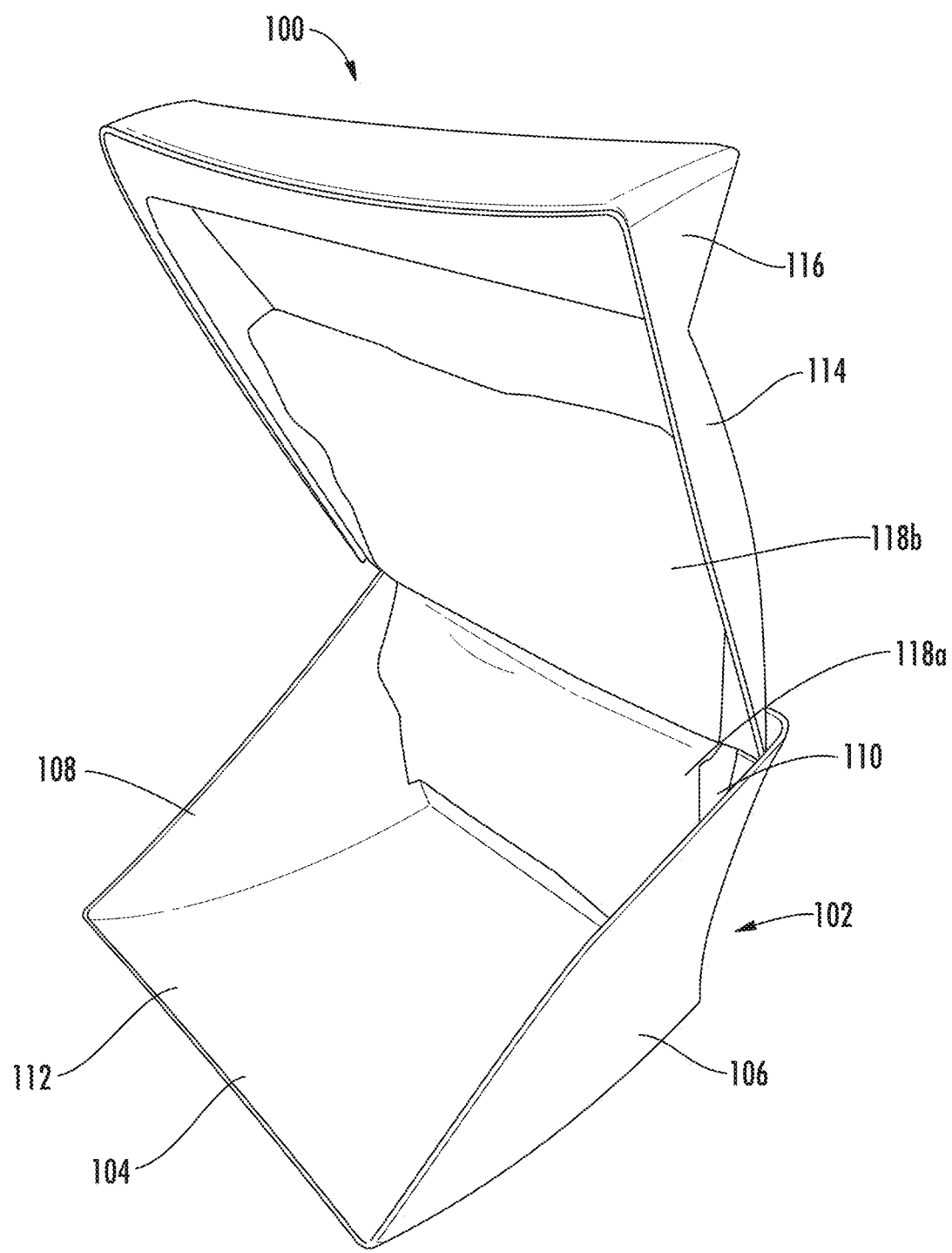
FIG. 4 is a perspective view of an aerodynamic vehicle attachment with the lid in the open position, in accordance with some embodiments.

FIG. 3 is perspective view of a hinge 118 for the aerodynamic vehicle attachment 100, in accordance with some embodiments. A hinge 118 is coupled to the face 110 of the body 102 and the lid 114, which enables the lid 114 to be rotatable relative to the body 102. In some embodiments, the hinge 118 is comprised of a fabric which may be folded and has a first leg 118a adhered to the inner surface of the face 110 of the body 102 and a second leg 118b adhered to the inner surface of the lid 114. This adhering of the hinge 118 to the body 102 is shown in FIG. 4. FIG. 4 is a perspective view of an aerodynamic vehicle attachment 100 with the lid 114 in the open position, in accordance with some embodiments. The interior storage compartment 112 is hollow and accessible with the lid 114 in the open position. The first leg 118a and the second leg 118b of the hinge 118 may extend a partial distance or the entire distance on the face 110 and the lid 114. In other embodiments, the hinge 118 may be comprised of plastic, metal, or composite materials or a combination thereof and adhered to the face 110 and the lid 114. In further embodiments, the hinge 118 may be comprised of fasteners such as bolts, screws, clips, latches, levers, traditional hinges, or magnets.

Figure 5:
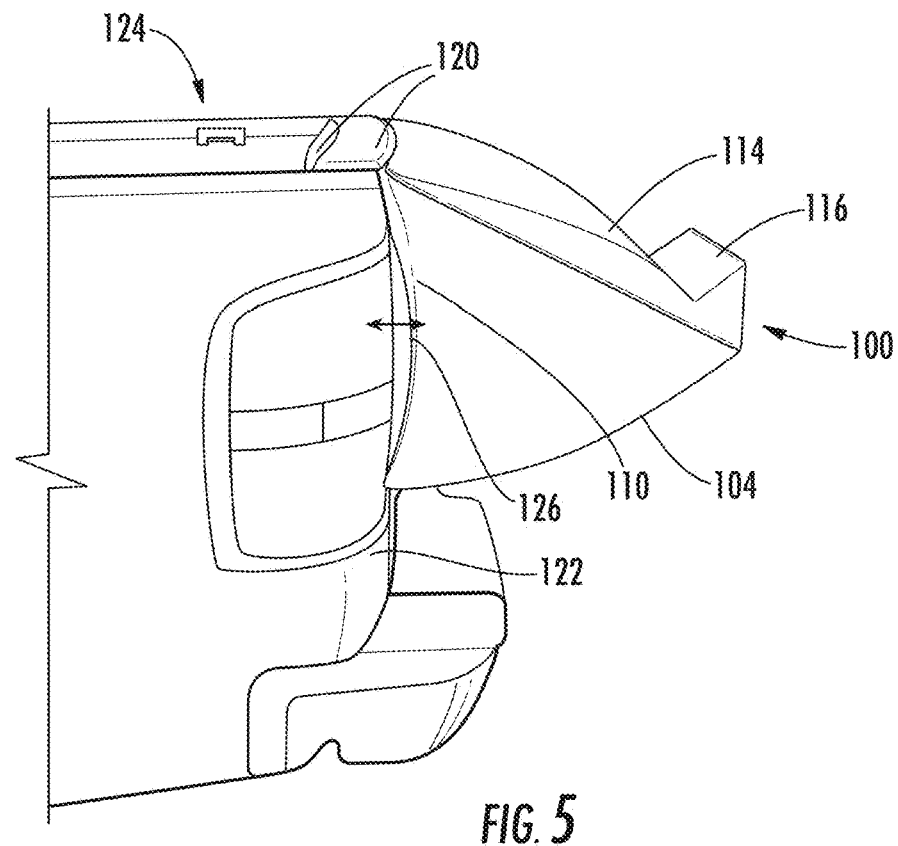
FIG. 5 is a side view of the aerodynamic vehicle attachment coupled to the tailgate of the vehicle, in accordance with some embodiments.
Figure 6:
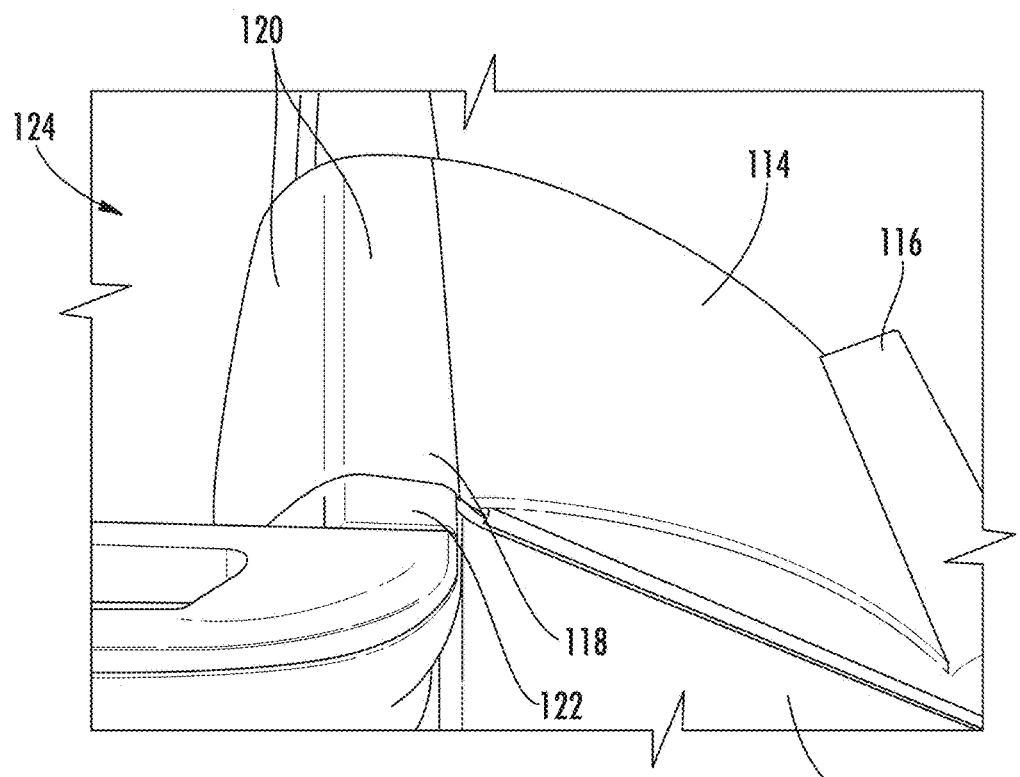
FIG. 6 illustrates installing the fastener to the tailgate, in accordance with some embodiments.

Referring to FIG. 3, the hinge 118 has a fastener 120 which is configured to removably couple to an outer surface of a top of a tailgate 122 of a vehicle so that the aerodynamic vehicle attachment 100 is coupled to the outside of the vehicle. FIG. 5 is a side view of the aerodynamic vehicle attachment 100 coupled to the tailgate 122 of a vehicle 124, in accordance with some embodiments. The fastener 120 of the hinge 118 may be located only at a top edge of the face 110 of the body 102, or between the body 102 and the lid 114. The fastener 120 is coupled to the outer surface of the top of the tailgate 122, and in some embodiments, the fastener 120 may be via a hook and loop system or an adhesive. FIG. 6 illustrates installing the fastener to the tailgate 122, in accordance with some embodiments. The fastener 120 may have at least one patch of a hook and loop system or an adhesive strip. For example, at least one patch of a hook and loop system may be mounted on the top of the tailgate 122 and/or the top edge of the inner side (e.g. pickup bed side) of the tailgate 122 which is configured to mate with the fastener 120 (e.g. hook and loop system) of the aerodynamic vehicle attachment 100. FIG. 3 illustrates two patches of the hook and loop system as the fastener 120. In other embodiments, these may be adhesive strips.

Figure 7A:
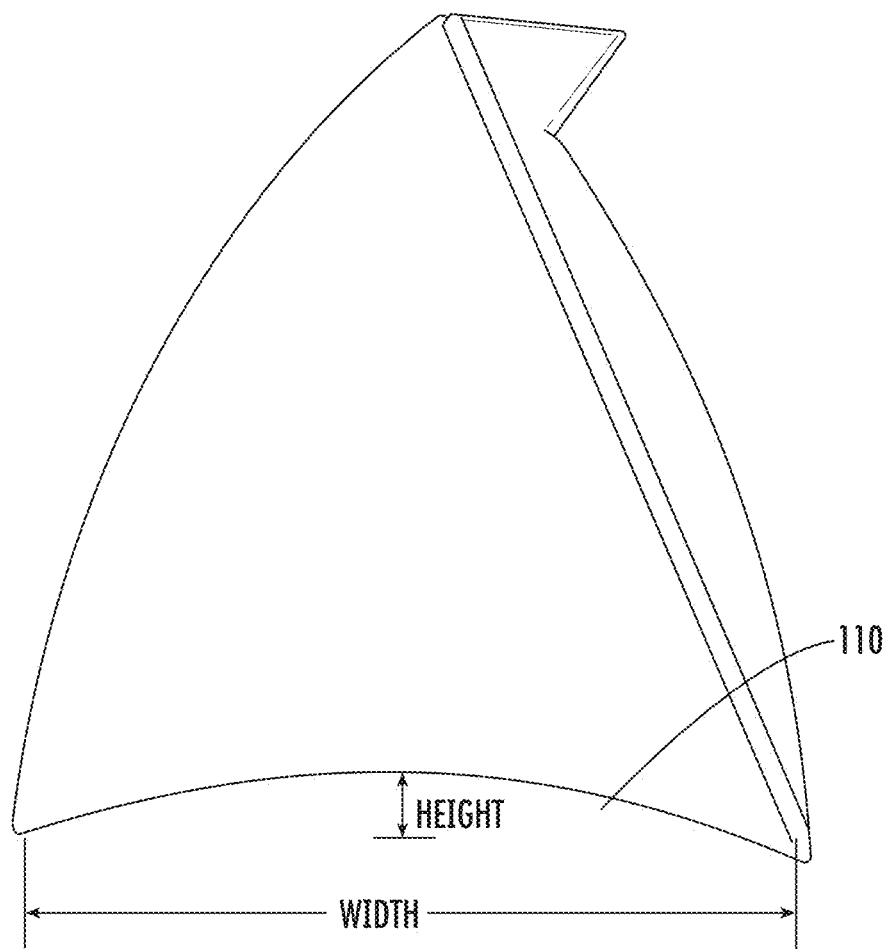
FIG. 7A is a rotated side view of the aerodynamic vehicle attachment, in accordance with some embodiments.
Figure 7B:
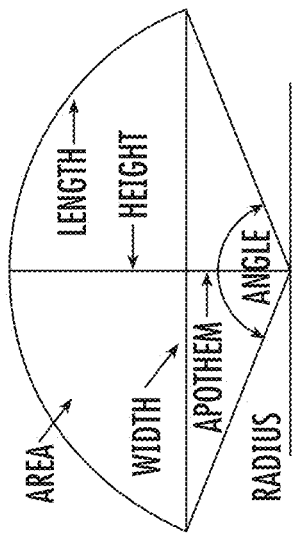
FIG. 7B is a table calculating characteristics of an example embodiment of the base contour of the base of the body

When the aerodynamic vehicle attachment 100 is coupled to the tailgate 122 of the vehicle 124, the face 110 is oriented vertically and the lid 114 is angled downward toward a ground. The face 110 may have a concave shape relative to the tailgate 122 which creates a gap 126 (FIG. 5) between the face 110 of the body 102 and the tailgate 122. FIG. 7A is a rotated side view of the aerodynamic vehicle attachment 100, in accordance with some embodiments. In this view, the face 110 is oriented parallel to a horizontal plane to enable description of the geometry of the face 110. A circular arc is recognized in the design of the concave face 110, and the characteristics of the arc of the concave face 110 may be defined and detailed. FIG. 7A defines a height of the arc which corresponds to the gap 126, and a width of the arc. FIG. 7B is a table calculating an example embodiment of the arc of the curve of the face 110, in accordance with some embodiments. For this example embodiment, the height of the arc, or gap 126, may be 3.7 centimeters with a width of the arc of 44.0 centimeters. In other embodiments, the gap 126 between the face 110 and the tailgate 122 may be 3.0 to 5.0 centimeters or at least 3.0 centimeters. The concave shape of the face 110 allows a bottom edge of the face 110 to apply a force on the tailgate 122 at the contact point and thus, the aerodynamic vehicle attachment 100 remains in place while the vehicle is stationary or in motion. The gap 126 also allows clearance for emblems, lettering or protruding shapes attached to the tailgate from the manufacturer.

Figure 8:
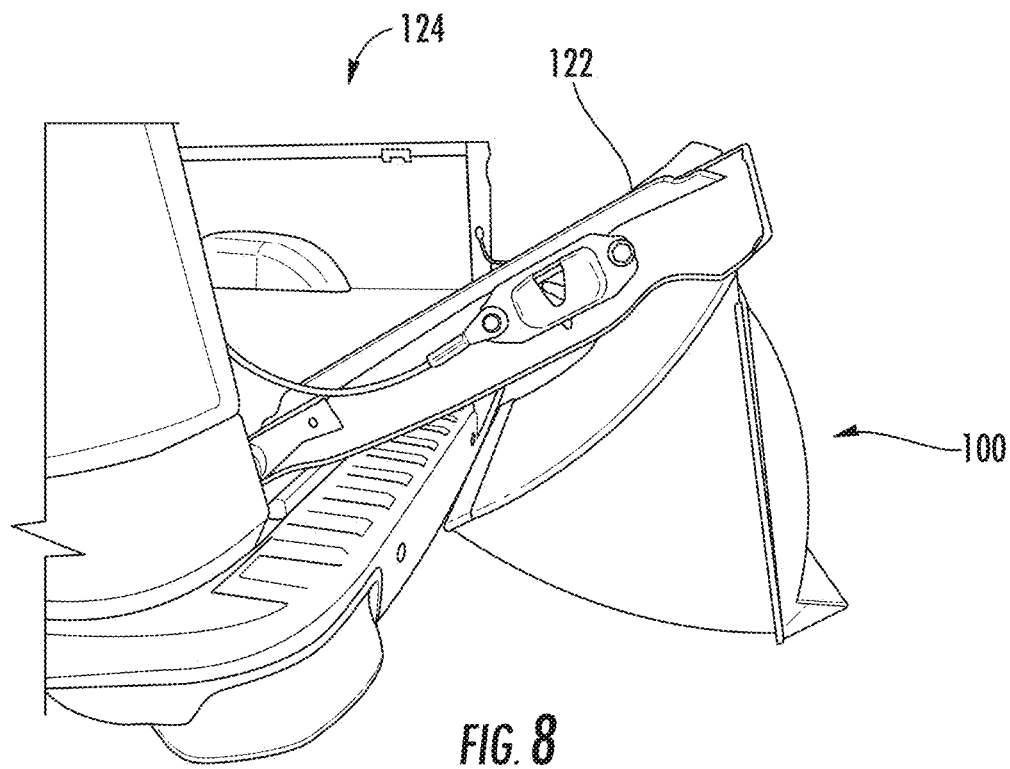
FIG. 8 is side view of an aerodynamic vehicle attachment coupled to the vehicle while articulating the tailgate, in accordance with some embodiments.

The fastener 120 which is located only at a top edge of the face 110 of the body 102 may be the only attachment point to the vehicle 124. The bottom edge of the face 110 of the body 102 may contact the outer surface of the tailgate 122 on a bottom portion of the tailgate 122, without being attached to the tailgate 122. Consequently, the handle of the tailgate 122 is easily accessible and the tailgate can be opened and closed in a normal operating manner. FIG. 8 is side view of an aerodynamic vehicle attachment 100 coupled to the vehicle 124 while articulating the tailgate 122, in accordance with some embodiments. The dimensions of the body 102 and the lid 114 are such that there is no contact with a bumper of the vehicle 124, any part of the vehicle 124 or the round when operating the tailgate 122. Because the bottom edge of the face 110 of the body 102 is unattached and free, the bottom edge pivots away from the tailgate 122 when the tailgate is opened or closed, and the bottom edge of the face 110 of the body 102 drops toward the ground.

Figure 9:
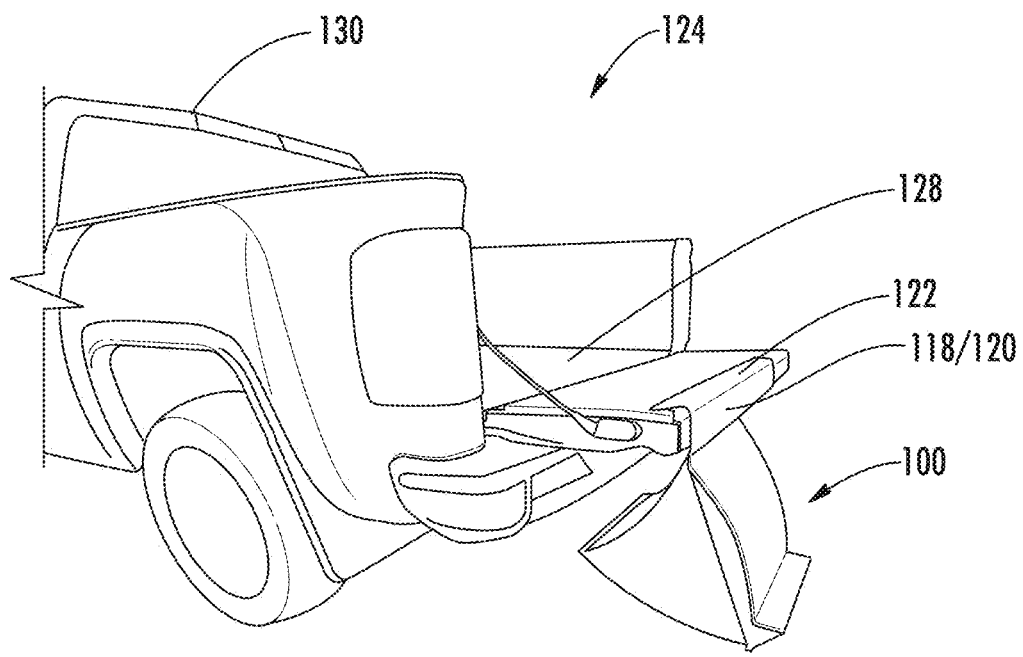
FIG. 9 is a perspective view of an aerodynamic vehicle attachment with the tailgate in the open position, in accordance with some embodiments.

FIG. 9 is a perspective view of an aerodynamic vehicle attachment 100 coupled to the vehicle 124 while the tailgate 122 in the open position, in accordance with some embodiments. When the tailgate is in an open position, the aerodynamic vehicle attachment 100 is coupled at a top edge of the face 110 of the body 102 and a bottom edge of the face 110 of the body hangs free in space. The body 102 and the lid 114 have dimensions such that there is no contact with a bumper of the vehicle 124, any part of the vehicle 124 or a ground. These dimensions are features of the design and many advantages are evident. For example, when the aerodynamic vehicle attachment 100 is attached, the full use of the cargo capacity of the vehicle is available because the aerodynamic vehicle attachment 100 rotates out of the way and is not mounted in a pickup bed 128. The loading area for the pickup bed 128 is clear with no sharp components protruding that may interfere with the task or objects, for example, when sliding wood into the pickup bed 128. In contrast, conventional products are sometimes mounted inside of the bed of the vehicle 124 thus decreasing cargo space and impeding the loading zone of the pickup bed 128.

The body 102 and the lid 114 of the aerodynamic vehicle attachment 100 may be comprised of plastic, metal, or a composite material, or a combination thereof. The enables the aerodynamic vehicle attachment 100 to be lightweight and manageable by a single user while being inexpensive to manufacture, inexpensive to purchase compared to other aerodynamic vehicle attachments available in the marketplace, and recyclable. The fastener 120 with the hook and loop system or adhesive configuration enables the aerodynamic vehicle attachment 100 to be quickly, easily and conveniently installed onto the vehicle 124. Likewise, the aerodynamic vehicle attachment 100 may be quickly, easily and conveniently removed from the vehicle 124. The aerodynamic vehicle attachment 100 may be installed or removed from the tailgate 122 without the use of a tool and by a single user. Conventional products available in the marketplace for storage or improved aerodynamics are permanently mounted to the vehicle and cannot be easily or conveniently installed, removed or stored. When removing these other products, there may be damage to the vehicle such as miscellaneous drilled holes, scuffing to the finished surfaces such as paint or coatings, or dents from various attachments. In contrast, in the present embodiments the vehicle 124 and specifically the tailgate 122 is not altered or damaged such as by removing components, replacing components, or drilling holes when installing, using or removing the aerodynamic vehicle attachment 100. Additionally, when not being used, the aerodynamic vehicle attachment 100 may be stored in the pickup bed 128 or cab 130 of the vehicle 124.

The use of the aerodynamic vehicle attachment 100 does not alter the tailgate 122 or the vehicle 124. Some conventional apparatuses for improved aerodynamic performance require removing and replacing the tailgate, hence storing a bulky, heavy tailgate, or may not allow the tailgate to operate in a normal manner. Other available products are inconvenient and time consuming to use by covering the entire pickup bed such as a tonneau cover, which has to be removed anytime the pickup bed is needed for use. Other products may detract from the aesthetics of the vehicle.

Figure 10:
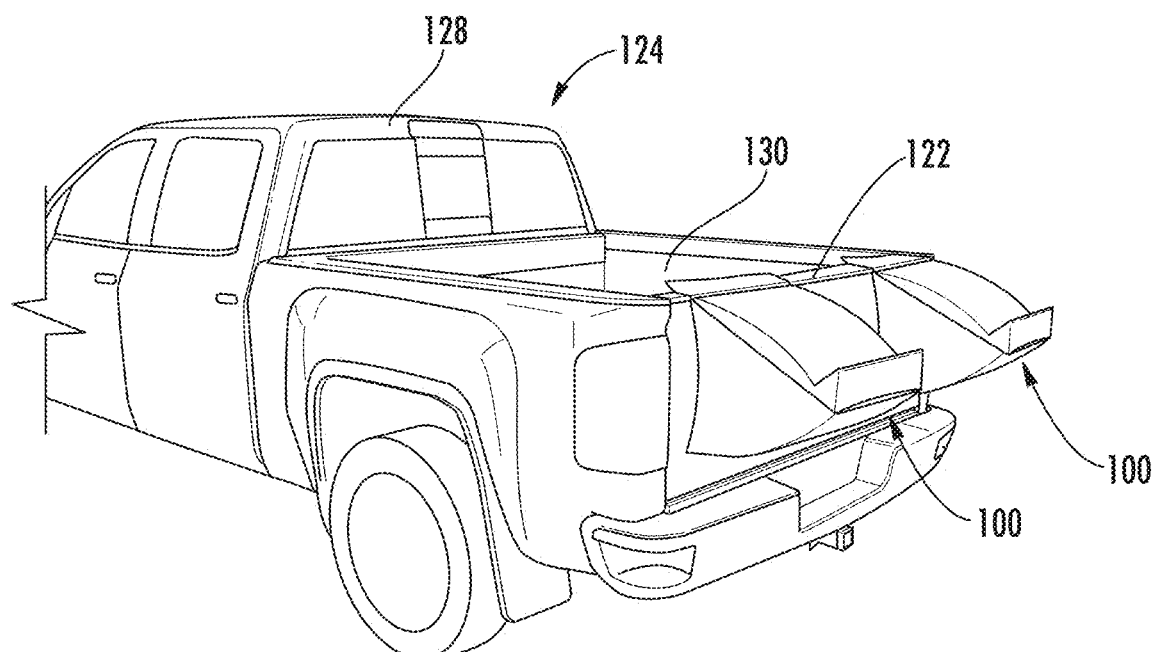
FIG. 10 is a perspective view of a plurality of aerodynamic vehicle attachments coupled to the vehicle, in accordance with some embodiments.

In some embodiments, a plurality of aerodynamic vehicle attachments 100 may be coupled to the tailgate 122 of the vehicle 124. FIG. 10 is a perspective view of a plurality of aerodynamic vehicle attachments 100 coupled to the vehicle 124, in accordance with some embodiments. In this example, two aerodynamic vehicle attachments 100 are installed and shown. This provides additional storage and may enable further benefits to the aerodynamic features disclosed hereafter. In other embodiments, the base 104 may have a larger dimension such that it spans across the tailgate and the interior storage compartment 112 is increased. The dimension of the lid 114 may also be increased to accommodate the size of the larger base 104 and the larger interior storage compartment 112 so that the lid 114 is configured to cover the larger interior storage compartment 112. In some embodiments, there may be two lids 114 instead of one larger lid 114 for the increased size of the interior storage compartment 112.

Figure 11:
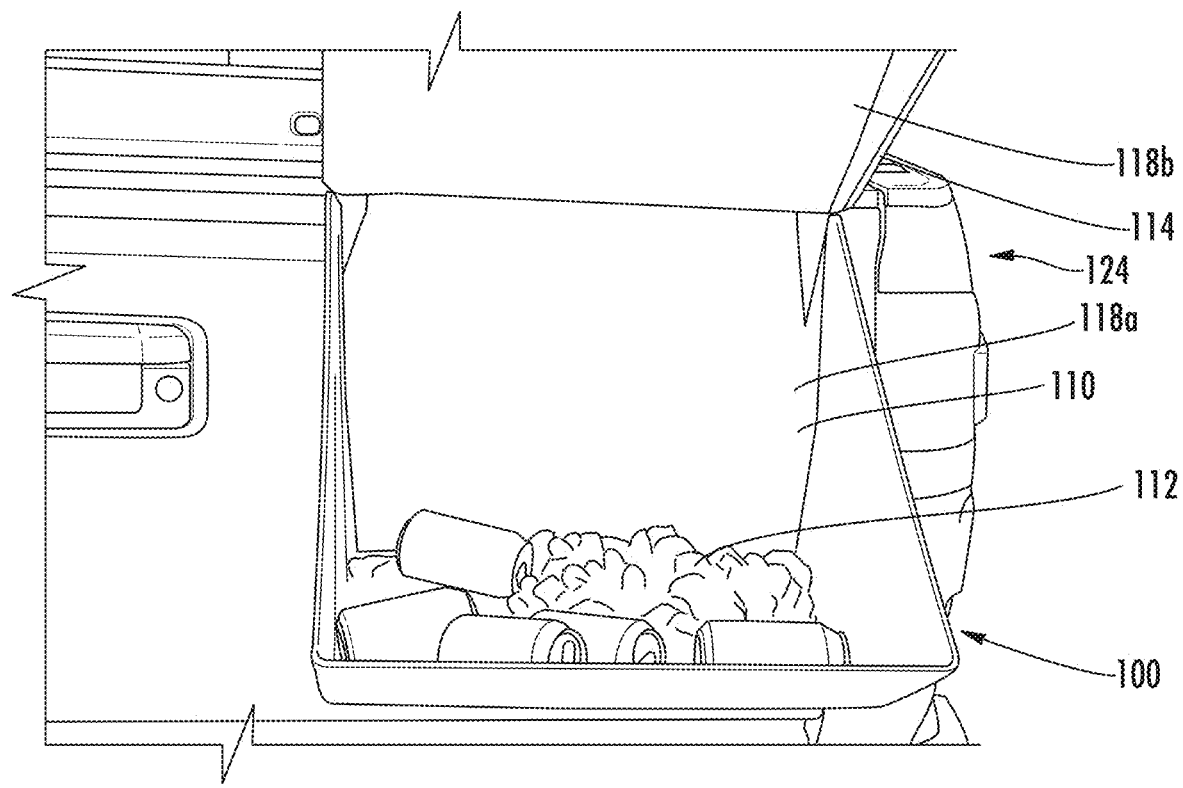
FIG. 11 depicts the interior storage compartment of the aerodynamic vehicle attachment, in accordance with some embodiments.

The interior storage compartment 112 provides additional storage which is covered and protected from the weather. FIG. 11 depicts the interior storage compartment 112 of the aerodynamic vehicle attachment 100, in accordance with some embodiments. In some embodiments, the interior storage compartment 112 may be configured as, for example, a cooler. The aerodynamic vehicle attachment 100 is coupled to the tailgate 122 which enables a convenient height for ease and accessibility.

Figure 12:
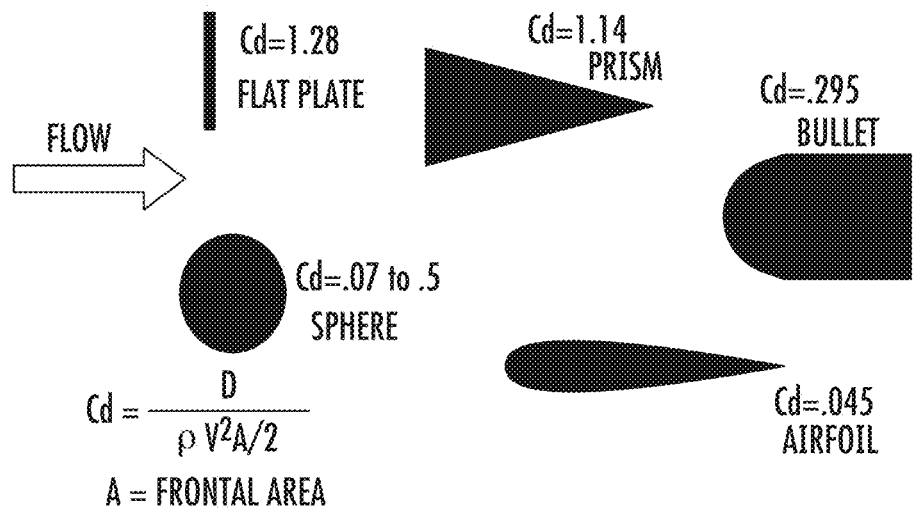
FIG. 12 depicts simplified schematics of objects and their corresponding drag coefficient Cd, as known in the art.
Figure 13:
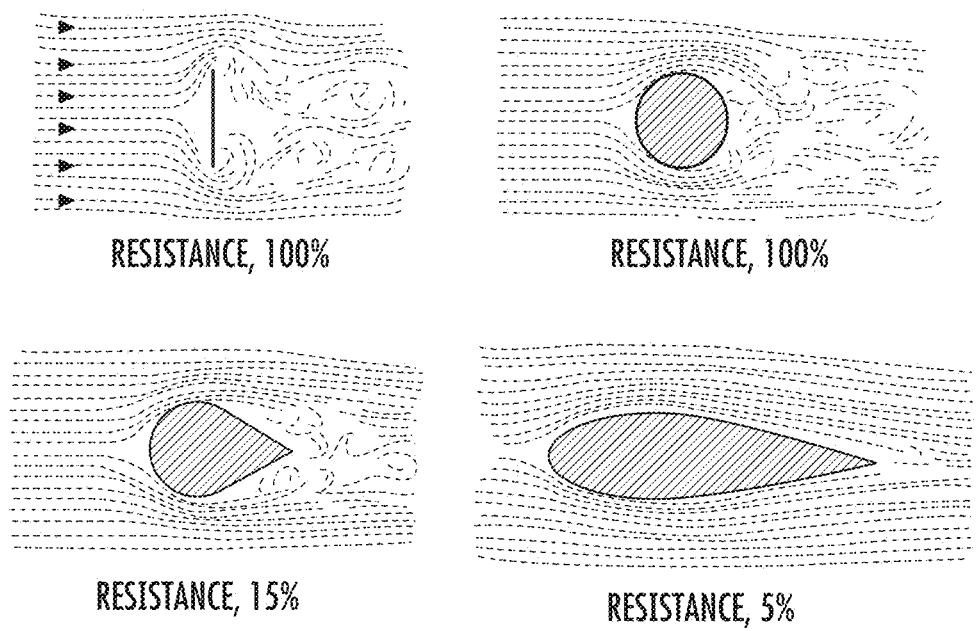
FIG. 13 depicts simplified schematics of the air resistance for the objects, as known in the art.

Drag is a force that opposes the motion of an object through the surrounding environment, such as air in the case of a pickup truck. The shape of the object traveling through air has a great effect on the amount of drag. Drag depends on many factors including the density of the air, the square of the velocity, the viscosity of air, the compressibility of air, the size and shape of the object, and the inclination of the object to the flow. The calculation of a drag coefficient is designated as "Cd." The drag equation states that drag D is equal to the drag coefficient Cd times the density ρ times half of the velocity V squared times the reference area A or $D=Cd*A*0.5*\rho*V^2$. The drag coefficient Cd may be calculated for various shapes of objects where the area is the frontal area of the object. It is desirable to have the least amount of drag, therefore, it is advantageous to have a design with a small drag coefficient Cd. FIG. 12 depicts simplified schematics of objects and their corresponding drag coefficient Cd, as known in the art. The object with an airfoil shape produces the smallest drag coefficient Cd (Cd=0.045) of the objects shown. FIG. 13 depicts simplified schematics of the air resistance for the objects, as known in the art. The object with the airfoil shape produces the least amount of air resistance (5%) of the objects shown.

Figure 14A:
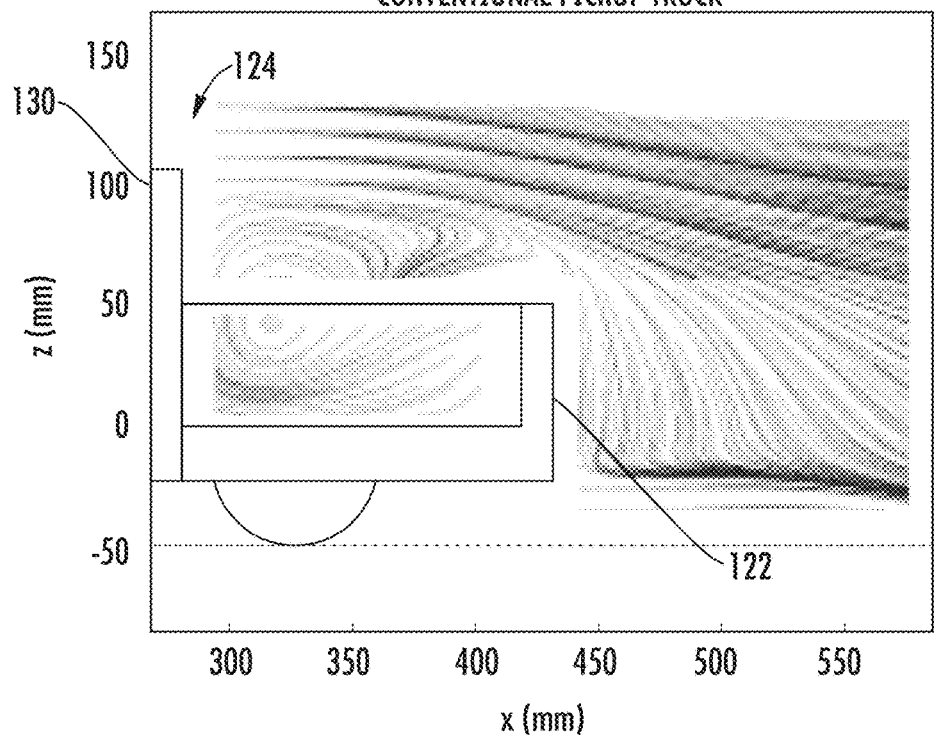
FIG. 14A is a side view of the airflow rearward of the cab of the conventional vehicle while the vehicle is in motion.
Figure 14B:
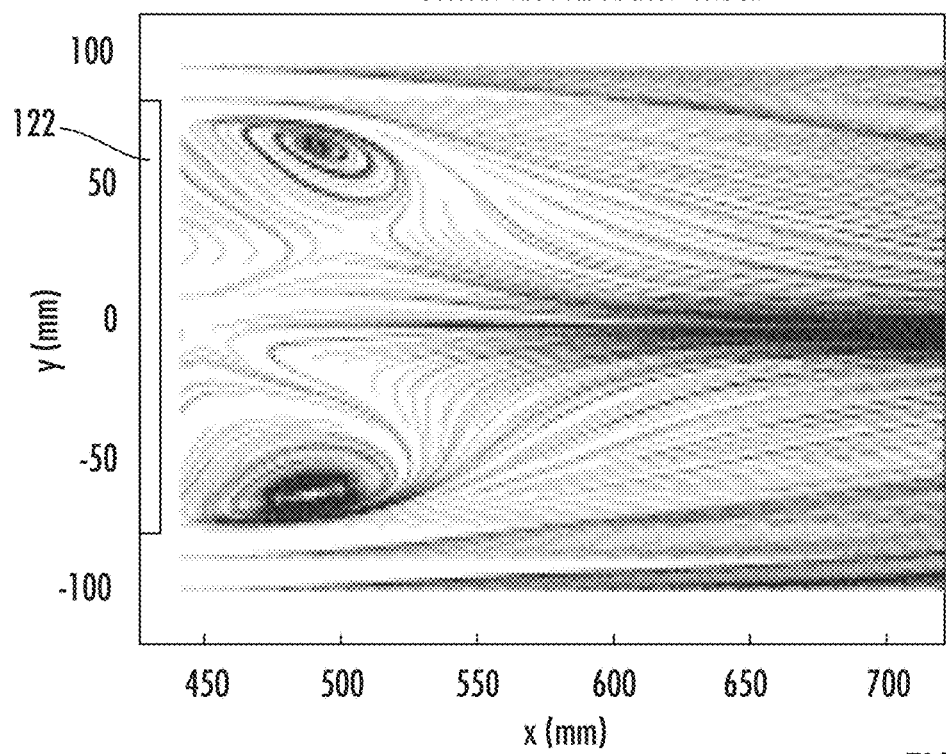
FIG. 14B is a top view of the airflow rearward of the tailgate of the conventional vehicle while the vehicle is in motion.
Figure 15A:
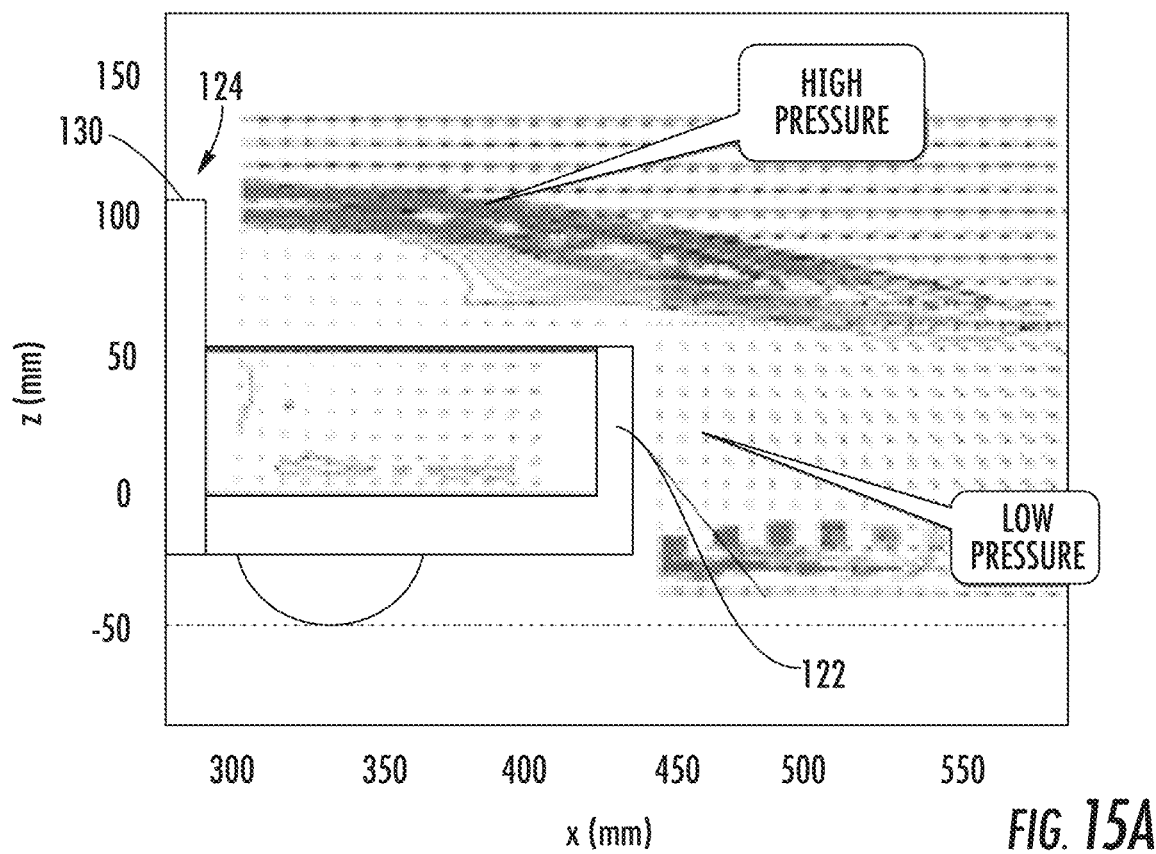
FIG. 15A is a side view of the airflow rearward of the cab of the moving, conventional vehicle.
Figure 15B:
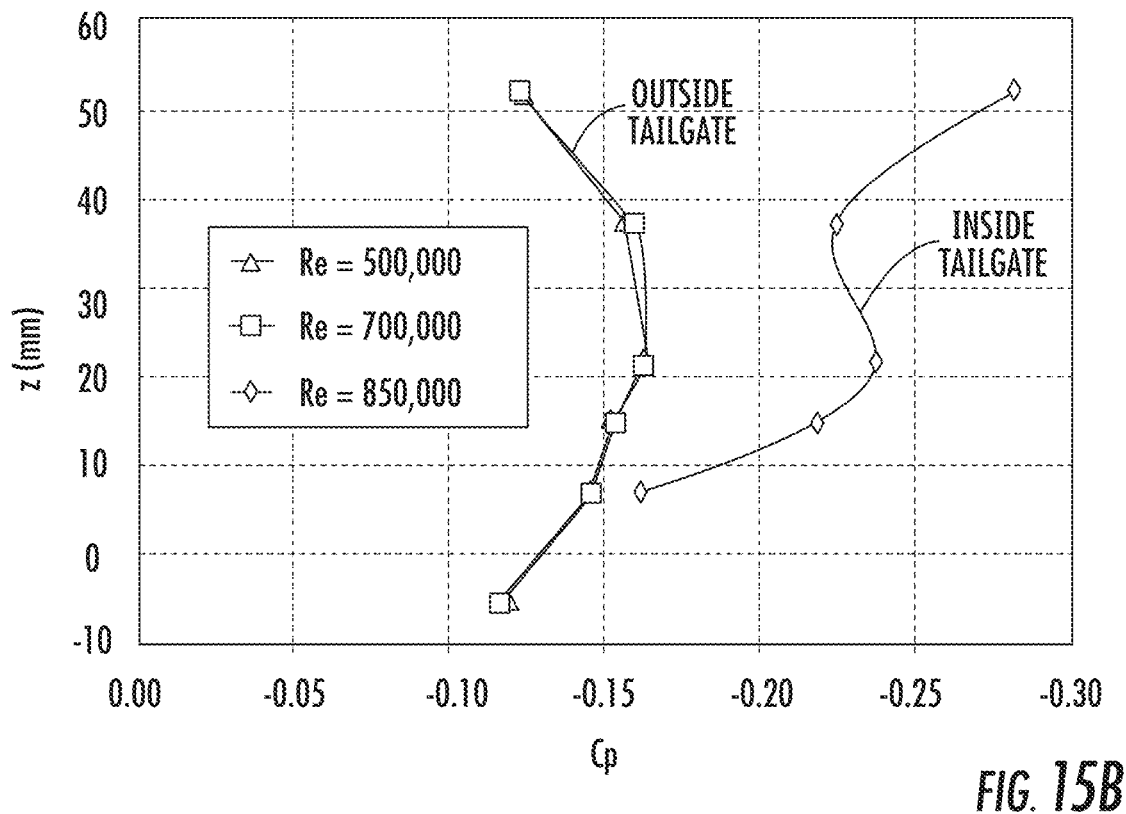
FIG. 15B is a simplified graph of the drag of the conventional pickup truck.

When a pickup truck is in motion, airflow passes over the cab 130 and just rearward of the cab 130, and a low-pressure area forms while turbulence is increased just rearward of the tailgate 122. FIG. 14A is a side view of the airflow rearward of the cab 130 of the conventional vehicle 124 while the vehicle 124 is in motion, without the aerodynamic vehicle attachment 100. FIG. 14B is a top view of the airflow rearward of the tailgate 122 of the conventional vehicle 124 while the vehicle 124 is in motion, without the aerodynamic vehicle attachment 100. Air cannot fill the vacuum effect created just rearward of the tailgate 122. FIG. 15A is a side view of the airflow rearward of the cab 130 of the moving, conventional vehicle 124. For example, a high pressure area is formed rearward of the cab 130 and above the pickup bed 128, without the aerodynamic vehicle attachment 100. FIG. 15B is a simplified graph of the drag of a conventional pickup truck. The graph illustrates the resulting drag of the conventional pickup truck in motion, without the aerodynamic vehicle attachment 100. Cp is the pressure coefficient and Re is the Reynolds number. The drag just rearward of the tailgate ranges between −0.11 to −0.16, and the drag inside of the tailgate 122 ranging between −0.16 to −0.28.

The aerodynamic vehicle attachment 100 coupled to the vehicle 124 improves the aerodynamics of the vehicle 124 by the shape of the contour of the body 102 and the shape of the contour of the lid 114. Both the body 102 and the lid 114 have curved surfaces so when the turbulent airflow from the moving vehicle contacts these surfaces, the turbulent airflow is deflected resulting in laminar airflow directed across the contour of the base 104 and the contour of the lid 114. This creates less air turbulence and less drag on the vehicle 124 because the aerodynamic vehicle attachment 100 is a "tail" for the vehicle 124 making a more airfoil shape of the vehicle 124 when in motion. For example, the base contour of the body 102 and the lid contour of the lid 114 form an airfoil shape which directs laminar air flow across the base contour and the lid contour creating less air turbulence and less drag on the vehicle.

Figure 16A:
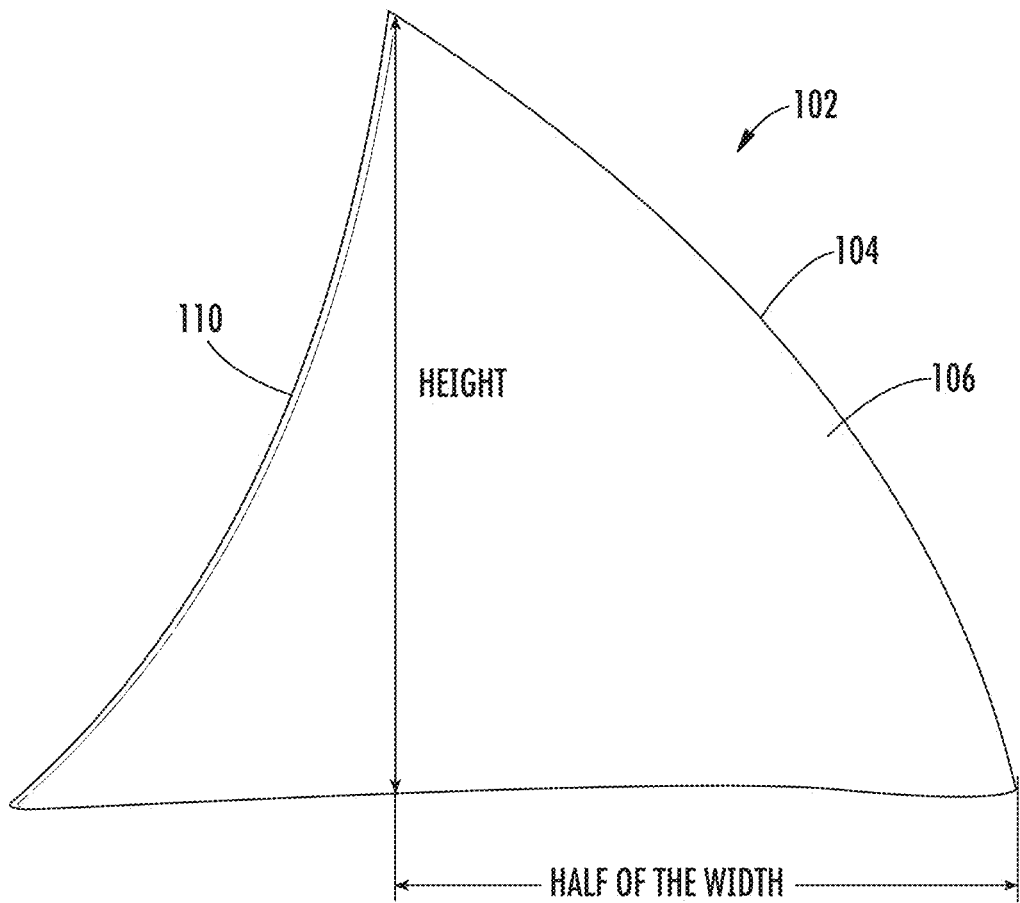
FIG. 16A is a rotated side view of the body of the aerodynamic vehicle attachment, in accordance with some embodiments.
Figure 16B:
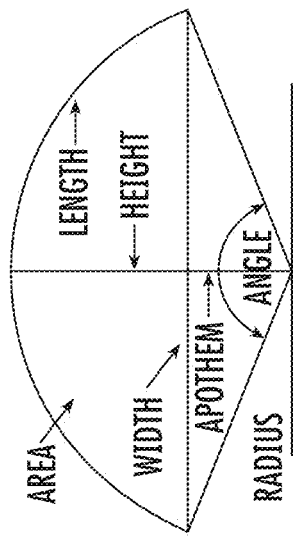
FIG. 16B is a table calculating characteristics of an example embodiment of the base contour of the base of the body.

The base 104 has a first aerodynamic shape with a base contour of the base 104. The base contour may be curved such as upward (i.e., the peak of the arc is upward) when coupled to the vehicle 124. FIG. 16A is a rotated side view of the body 102 of the aerodynamic vehicle attachment 100, in accordance with some embodiments. In this view, the body 102 is oriented with the opening of the interior storage compartment 112 parallel to a horizontal plane. The characteristics of the circular arc of the base 104 of the body 102 may be defined and detailed. FIG. 16A defines a height of the arc and a half of the width of the arc. FIG. 16B is a table calculating characteristics of an example embodiment of the base contour of the base 104 of the body 102. For this example embodiment, the radius of the arc may be 34.45 centimeters with an angle of the arc of 198.54 degrees. In other embodiments, the radius of the arc may be between 32.0 centimeters and 37.0 centimeters with an angle of the arc between 185.0 degrees and 215.0 degrees.

Figure 17A:
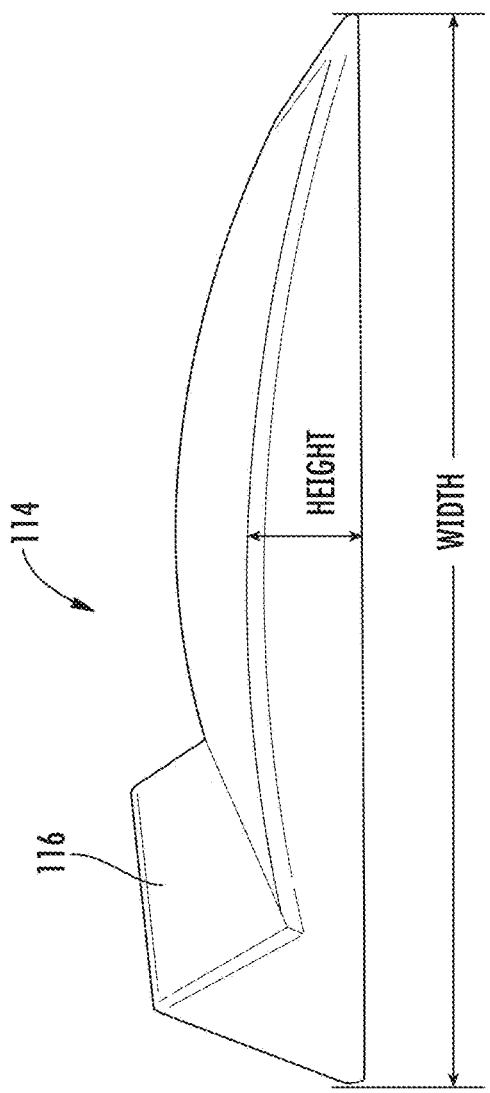
FIG. 17A is a side view of the lid of the aerodynamic vehicle attachment, in accordance with some embodiments.
Figure 17B:
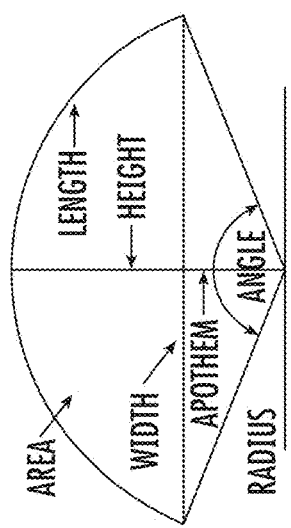
FIG. 17B is a table calculating an example embodiment of the lid contour of the lid, in accordance with some embodiments.

The lid 114 has a second aerodynamic shape with a lid contour of the lid 114. The lid contour may be curved. FIG. 17A is a side view of the lid 114 of the aerodynamic vehicle attachment 100, in accordance with some embodiments. In this view, the lid 114 is oriented parallel to a horizontal plane. The characteristics of the circular arc of the lid 114 may be defined and detailed. FIG. 17A defines a height of the arc and a width of the arc. FIG. 17B is a table calculating an example embodiment of the lid contour of the lid 114. For this example embodiment, the radius of the arc may be 74.40 centimeters with an angle of 41.97 degrees.

Figure 18A:
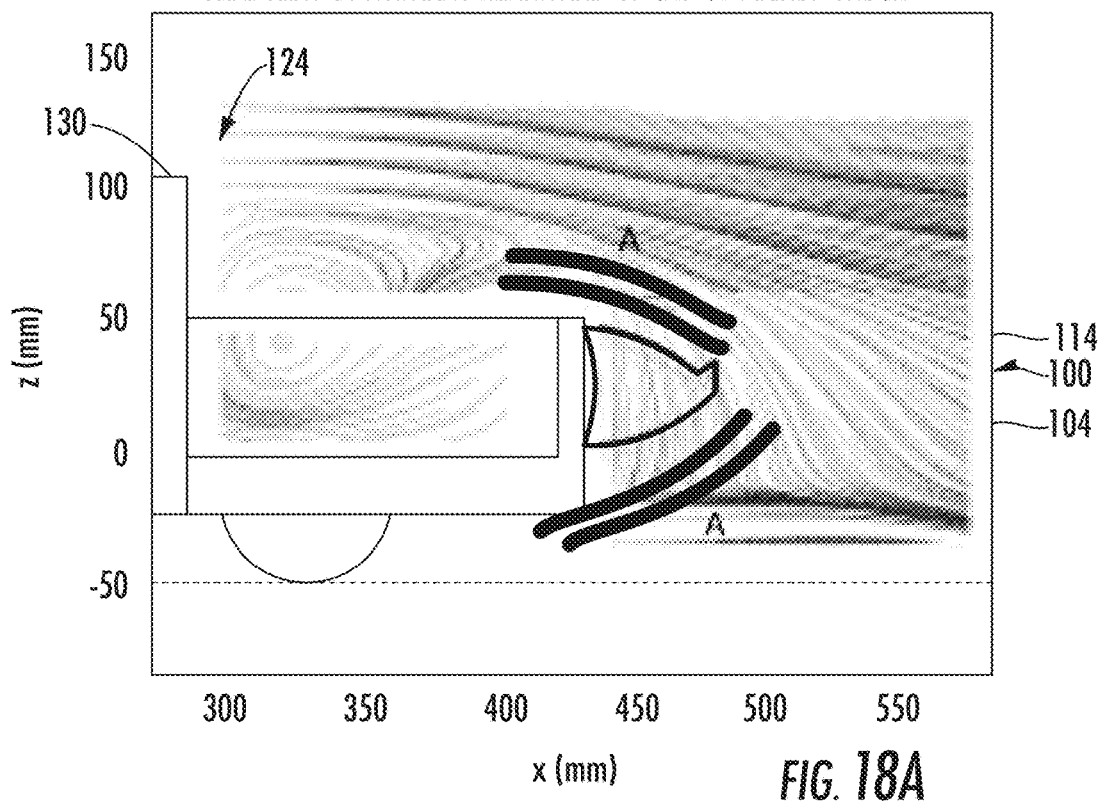
FIG. 18A is a side view of the airflow rearward of the cab of the vehicle with the aerodynamic vehicle attachment.
Figure 18B:
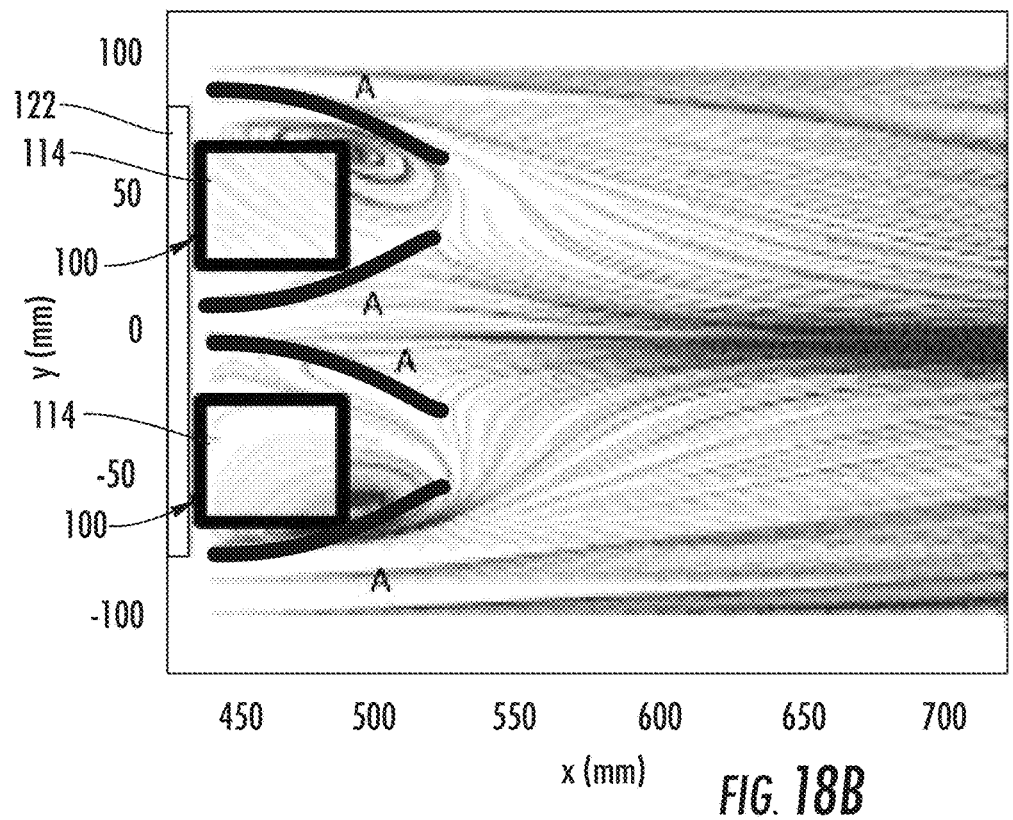
FIG. 18B is a top view of the airflow rearward of the tailgate of the vehicle with two aerodynamic vehicle attachments.
Figure 19A:
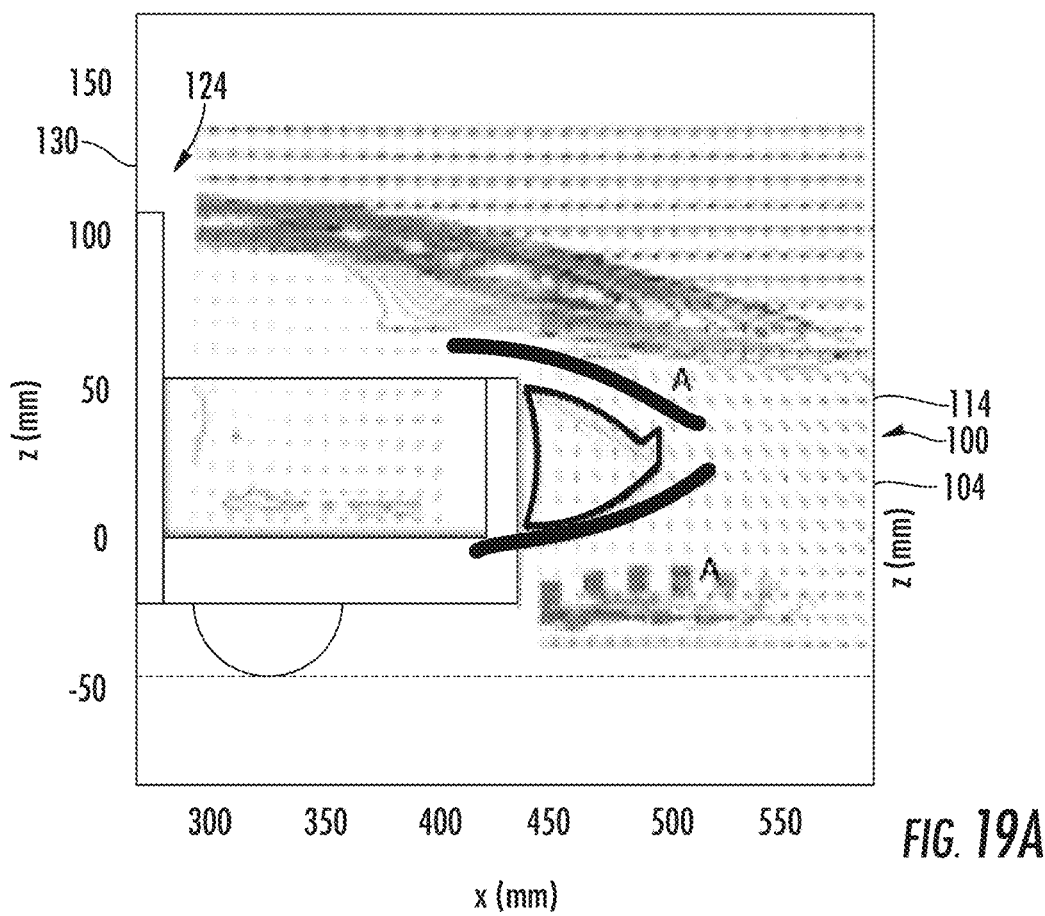
FIG. 19A is a side view of the airflow rearward of the cab of the moving vehicle with the aerodynamic vehicle attachment, in accordance with some embodiments.
Figure 19B:
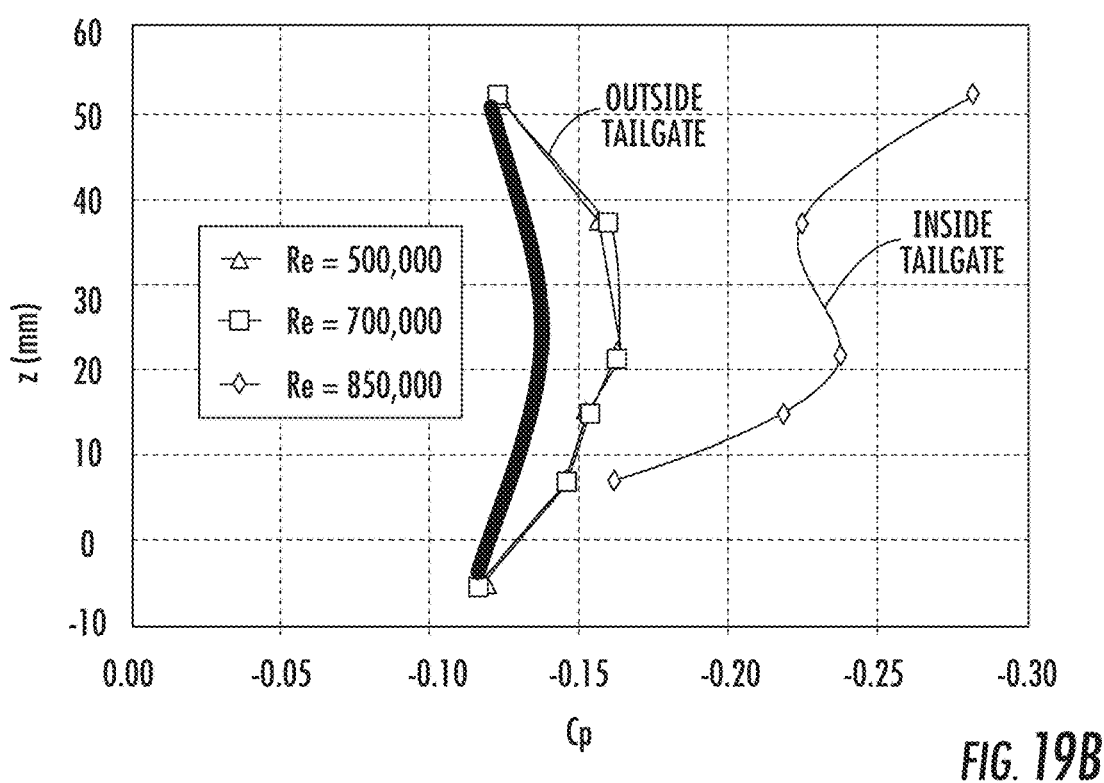
FIG. 19B is a simplified graph of the drag for a pickup truck with the aerodynamic vehicle attachment, in accordance with some embodiments.

FIG. 18A is a side view of the airflow rearward of the cab 130 of the vehicle 124 with the aerodynamic vehicle attachment 100, and FIG. 18B is a top view of the airflow rearward of the tailgate 122 of the vehicle 124 with two aerodynamic vehicle attachments 100. The aerodynamic vehicle attachment 100 occupies the low pressure area and the turbulent areas. The first aerodynamic shape of the base 104 and the second aerodynamic shape of the lid 114 direct the laminar airflow A across the contour of the base 104 and the contour of the lid 114 creating less air turbulence and less drag on the vehicle 124. FIG. 19A is a side view of the airflow rearward of the cab 130 of the moving vehicle 124 with the aerodynamic vehicle attachment 100, in accordance with some embodiments. The aerodynamic vehicle attachment 100 occupies the low pressure area and the airflow A passes over the aerodynamic shapes of the base 104 and the lid 114 which aids to smooth the flow and decreases drag. FIG. 19B is a simplified graph of the drag for a pickup truck with the aerodynamic vehicle attachment 100, in accordance with some embodiments. The graph illustrates the drag results as a bending curve B for the rear of the tailgate. The reduction in drag increases the pressure coefficient and reduces suction. Decreasing the drag on the vehicle 124 results in improved fuel efficiency which saves money, while reducing the use of fossil fuels and carbon dioxide emissions. It may be noted that the pressure coefficient inboard of the tailgate (e.g. inside of the pickup bed) is very low such as a negative value. Consequently, solutions for improved aerodynamics mounted inside of the tailgate 122 or inside of the pickup bed may be less effective than solutions coupled to the outer side of the tailgate 122.

Figures 20, 21:
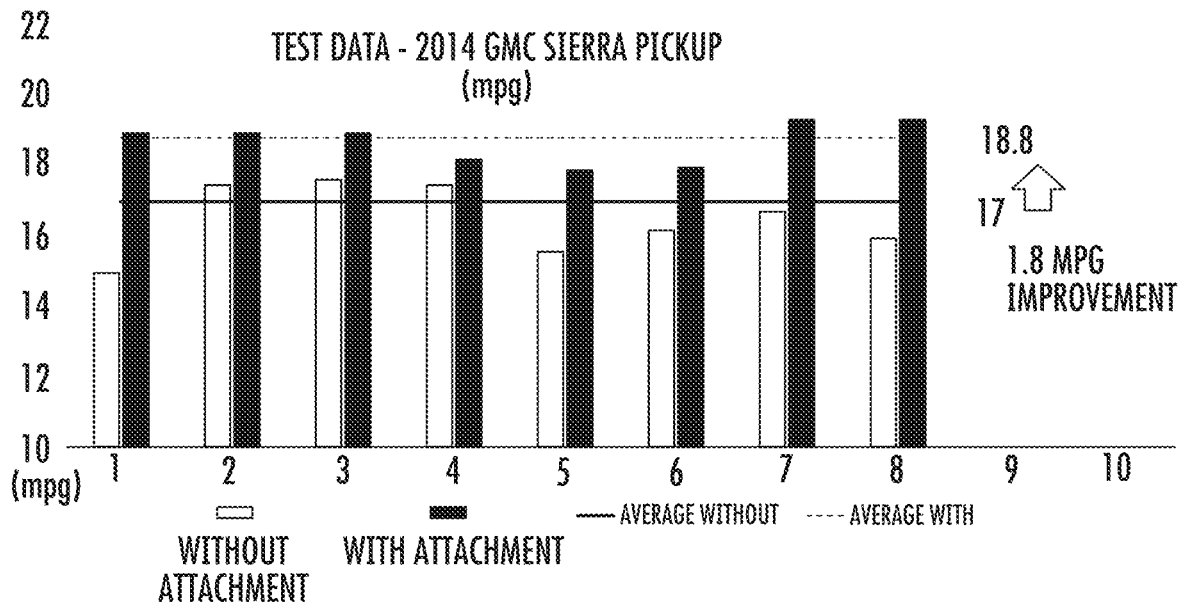
FIG. 20 is a simplified graph of fuel economy of a pickup truck with and without the aerodynamic vehicle attachment, in accordance with some embodiments.
FIG. 21 shows a simplified table of the fuel economy for pickup trucks with and without the use of the aerodynamic vehicle attachment, in accordance with some embodiments.

Test data was gathered using a 2014 GMC Sierra pickup truck driven over the same course with and without the aerodynamic vehicle attachment 100. FIG. 20 is a simplified graph of fuel economy of a pickup truck with and without the aerodynamic vehicle attachment 100, in accordance with some embodiments. The fuel economy was monitored and recorded on the y-axis for a sample of eight different times which is recorded on the x axis. The average fuel economy of the eight experimental runs was 17.0 mpg without the use of the aerodynamic vehicle attachment 100 and 18.8 mpg with the use of the aerodynamic vehicle attachment 100. Thus, the average miles per gallon used over the eight samples was improved by about 1.8 mpg when using the aerodynamic vehicle attachment 100. Data for other vehicles was also collected and is summarized in FIG. 21 FIG. 21 shows a simplified table of the fuel economy for pickup trucks with and without the use of the aerodynamic vehicle attachment 100, in accordance with some embodiments. In each case, the fuel economy was improved with the use of the aerodynamic vehicle attachment 100. In some embodiments, using the aerodynamic vehicle attachment 100 improved the fuel economy by at least 1.4 mpg, 1.4 mpg to 2.0 mpg, or 1.0 mpg to 2.0 mpg.

Adding weight to the vehicle and mounting a device outside of and rearward of the tailgate to improve fuel economy is counterintuitive in the industry. Normally, these design characteristics are associated with increasing drag of the vehicle which negatively impacts the fuel economy. The location of the aerodynamic vehicle attachment 100 fills a space rearward of the tailgate 122 having a vacuum effect while the vehicle is in motion. The novel, aerodynamic shapes of the curved surfaces of the body 102 and the lid 114 of the aerodynamic vehicle attachment 100 create an airfoil-like object which enables the airflow to smooth out in parallel layers as opposed to turbulent airflow. The airfoil shape directs and deflects laminar airflow across first aerodynamic shape and the second aerodynamic shape creating less air turbulence and less drag on the vehicle and thereby increases fuel economy.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. An aerodynamic vehicle attachment comprising:
a body being triangular and having a base, a first sidewall, a second sidewall, and a face, the base having a base contour, wherein the base, the first sidewall, the second sidewall and the face define an interior storage compartment;
a lid covering the interior storage compartment and having a lid contour and a lip extending upward external relative to the interior storage compartment; and
a hinge coupled to the face of the body and the lid, and having a fastener, the fastener being located only at a top edge of the face of the body;
wherein the fastener is configured to removably couple to an outer surface of a top of a tailgate of a vehicle so that the aerodynamic vehicle attachment is coupled to an outside of the vehicle.

2. The aerodynamic vehicle attachment of claim 1, wherein the base contour of the body and the lid contour of the lid form an airfoil shape which directs laminar air flow across the base contour and the lid contour creating less air turbulence and less drag on the vehicle.

3. The aerodynamic vehicle attachment of claim 1, wherein the base contour of the body is curved and having a radius of an arc between 32 centimeters and 37 centimeters with an angle of the arc between 185 degrees and 215 degrees.

4. The aerodynamic vehicle attachment of claim 1, wherein the lid contour is curved, the curve having a length of an arc of at least 54 centimeters and a height of the arc of at least 5 centimeters.

5. The aerodynamic vehicle attachment of claim 1, wherein the lid is angled downward toward the ground, the base is curved upward and the face is oriented vertically.

6. The aerodynamic vehicle attachment of claim 1, wherein the face of the body is concave relative to the tailgate creating a gap between the face of the body and the tailgate, the gap being a height of an arc, the height being at least 3.7 centimeters.

7. The aerodynamic vehicle attachment of claim 1, wherein the fastener is coupled to the outer surface of the top of the tailgate by a hook and loop system.

8. The aerodynamic vehicle attachment of claim 1, wherein:
the fastener is located at a top edge of the face of the body; and
a bottom edge of the face of the body contacts the outer surface of the tailgate on a bottom portion of the tailgate.

9. The aerodynamic vehicle attachment of claim 1, wherein when the tailgate is in an open position, the aerodynamic vehicle attachment is coupled at a top edge of the face of the body and a bottom edge of the face of the body hangs free in space, and the body has dimensions such that there is no contact with a bumper of the vehicle, any part of the vehicle or the ground.

10. The aerodynamic vehicle attachment of claim 1, wherein the lip is located at an edge of the lid opposite the hinge, spans across the edge and extends upward by 8 to 10 centimeters.

11. The aerodynamic vehicle attachment of claim 1, wherein the aerodynamic vehicle attachment is removable from the tailgate without the use of a tool.

12. An aerodynamic vehicle attachment comprising:
a body being triangular, having an interior storage compartment and a first aerodynamic shape;
a lid coupled to the body, configured to cover the interior storage compartment and having a second aerodynamic shape;
a fastener coupled to the body and the lid, and configured to removably couple to an outer surface of a top of a tailgate of a vehicle so that the aerodynamic vehicle attachment is coupled to the outside of the vehicle; and
wherein the first aerodynamic shape and the second aerodynamic shape direct laminar air flow across first aerodynamic shape and the second aerodynamic shape creating less air turbulence and less drag on the vehicle.

13. The aerodynamic vehicle attachment of claim 12, wherein the first aerodynamic shape has a curve with a radius of an arc of the curve of 32 centimeters to 37 centimeters, and an angle of the arc of the curve of 185 degrees to 215 degrees.

14. The aerodynamic vehicle attachment of claim 12, wherein the second aerodynamic shape has a curve a length of an arc of the curve at least 54 centimeters and a height of the arc of the curve of at least 5 centimeters.

15. The aerodynamic vehicle attachment of claim 12, wherein the fastener is coupled to the outer surface of the top of the tailgate of the vehicle by a hook and loop system.

16. The aerodynamic vehicle attachment of claim 12, wherein the fastener is located only at a top edge of a face of the body.

17. The aerodynamic vehicle attachment of claim 12, wherein the lid has a lip, the lip located at an edge of the lid opposite the fastener, spanning across the edge and extending upward by 8 to 10 centimeters.

18. The aerodynamic vehicle attachment of claim 12, wherein the lid is angled downward toward the ground, and the body is curved upward.

19. The aerodynamic vehicle attachment of claim 12, wherein:
the body has a base, a first sidewall, a second sidewall, and a face, and the face is oriented vertically;

the first aerodynamic shape has a curve with a radius of an arc of the curve at least 34 centimeters and an angle of the arc of the curve of at least 198 degrees;
the second aerodynamic shape has a curve with a length of an arc of the curve of at least 54 centimeters and a height of the arc of the curve of at least 5 centimeters; and
wherein the lid has a lip, the lip located at an edge of the lid opposite the fastener, spanning across the edge and extending upward by 8 to 10 centimeters.

* * * * *